United States Patent [19]

Terasawa

[11] Patent Number: 4,492,969

[45] Date of Patent: Jan. 8, 1985

[54] CAPPING DEVICE FOR A MULTI-INK JET HEAD

[75] Inventor: Koji Terasawa, Mitaka, Japan

[73] Assignee: Canon Kabushiki Kaisha, Tokyo, Japan

[21] Appl. No.: 432,438

[22] Filed: Oct. 4, 1982

[30] Foreign Application Priority Data

| | | | |
|---|---|---|---|
| Oct. 8, 1981 | [JP] | Japan | 56-160426 |
| Oct. 14, 1981 | [JP] | Japan | 56-162768 |

[51] Int. Cl.³ .......... G01D 15/18

[52] U.S. Cl. .......... 346/140 R

[58] Field of Search .......... 346/140 R

[56] References Cited

U.S. PATENT DOCUMENTS

| | | | |
|---|---|---|---|
| 4,383,263 | 5/1983 | Ozawa | 346/140 |
| 4,394,669 | 7/1983 | Ozawa | 346/140 |
| 4,403,233 | 9/1983 | Terasawa | 346/140 |
| 4,410,900 | 10/1983 | Terasawa | 346/140 |

*Primary Examiner*—Joseph W. Hartary

*Attorney, Agent, or Firm*—Fitzpatrick, Cella, Harper & Scinto

[57] ABSTRACT

A capping device for a multi-ink jet head is disclosed. The capping device is provided with means for keeping the nozzles of the head isolated from each other during the time of the head being capped.

13 Claims, 8 Drawing Figures

CAPPING DEVICE FOR A MULTI-INK JET HEAD

BACKGROUND OF THE INVENTION

1. Field of the Invention

The present invention relates to a capping device for an ink jet head provided with ink suction function. In particular, the present invention is directed to means for preventing undesirable mixture of different color inks after sucking the different color inks from a multi-ink jet head.

2. Description of the Prior Art

In the art there is known an ink jet head provided with a negative pressure generating function to suck the residual ink from the head after use. Also, such capping device is known which is exclusively used for a multi-ink jet head having two or more ink jet heads.

The use of such a capping device for a multi-ink jet head, however, produces the problem of undesirable mixture of different color inks. The individual heads in a multi-ink jet head are so designed as to jet different color inks from the respective nozzles. Since the nozzles are in communication with each other, if the multi-ink jet head is left standing with the capping device fitted thereto after ink suction, there is caused a mixture of the different color inks by the phenomenon of ink dispersion. This problem will be described hereinafter in further detail with reference to FIG. 1. In FIG. 1 showing a conventional multi-ink jet head with a capping device, the multi-ink jet head 1 is composed of four individual head units 1-1 to 1-4 assembled together. Although not shown, the multi-ink jet head is mounted on a carriage for movement together with the carriage. The individual head units 1-1 to 1-4 have the same structure comprising an ink storing subsidiary tank and a nozzle to jet the ink from the subsidiary ink tank. The inks contained in and jetted from the individual heads are different in color from each other. As shown in FIG. 1, the nozzles are completely closed by a cap 2. While closed by the cap 2, the nozzles are sucked by a suction pump 4 through tubes 3 in the manner of negative pressure suction. This suction is necessary to return the nozzles to the condition in which they are ready for printing. The tubes 3 are in communication with each other as seen in FIG. 1. Therefore, if the multi-ink jet head 1 is left standing with the nozzles capped with the cap 2, then the different color inks are mixed together in the respective nozzles and in the respective subsidiary ink tanks.

SUMMARY OF THE INVENTION

It is an object of the present invention to prevent the mixture of different color inks between the nozzles when they are capped with a capping device.

It is another object of the invention to provide a capping device for a multi-ink jet head which is simple in structure.

It is a further object of the invention to reduce the size of the device as a whole.

Other and further objects, features and advantages of the invention will appear more fully from the following description.

DETAILED DESCRIPTION OF PREFERRED EMBODIMENTS

Figure 1:
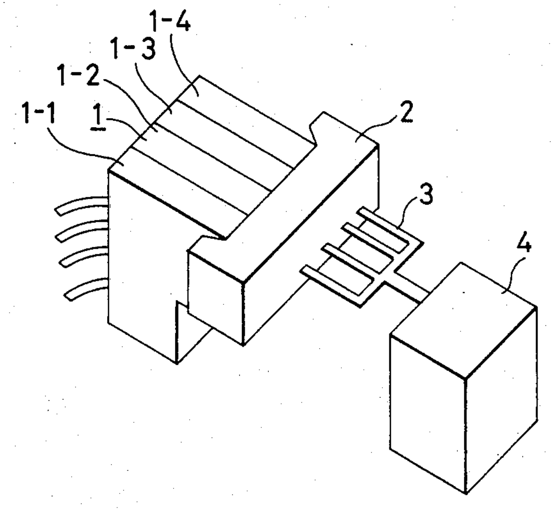
FIG. 1 PRIOR ART
FIG. 1 is a schematic illustration of a multi-ink jet head with a capping device according to the prior art.
Figure 2:
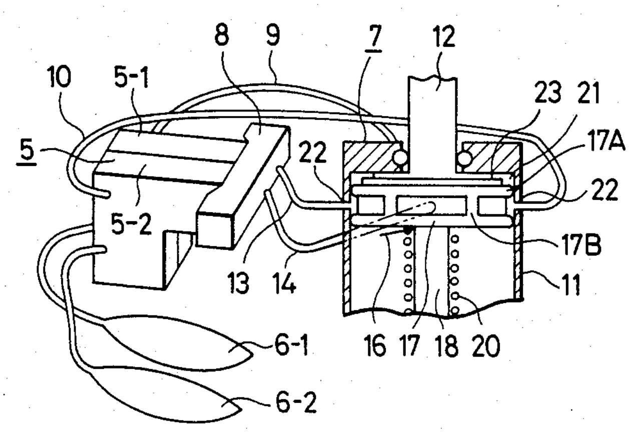
FIG. 2 is a view showing a first embodiment of the invention.

Referring to FIG. 2 showing an embodiment of the present invention, 5 denotes a multi-ink jet head mounted on a carriage (not shown) for movement together with the carriage.

Figure 3A:
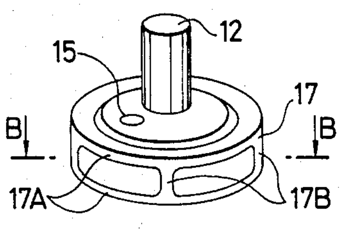
FIG. 3A is a perspective view of the piston thereof.
Figure 3B:
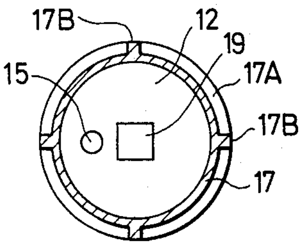
FIG. 3B is a sectional view of the piston.

The multi-ink jet head 5 is constituted of two head units 5-1 and 5-2 arranged in the direction in which the head 5 is moved for printing. The head units 5-1 and 5-2 are fixed to each other to form a unitary assembly. The head units have the same structure comprising an ink storing subsidiary tank and an ink jet nozzle of the ink-on-demand type (not shown). The head units are supplied jet inks from main tanks 6-1 and 6-2 when the inks are consumed in the heads. The amount of ink supplied is equal to the consumed amount. 7 denotes a negative pressure suction pump which constitutes a capping device together with a cap 8. The suction pump 7 applies to the individual nozzles a negative pressure to eliminate dust, bubbles, etc., from the fore ends of the nozzles. Also, the suction pump 7 serves to suck out any excessive air from the respective subsidiary ink tanks of the head units through air suction tubes 9 and 10. The suction pump 7 has an outer wall 11 serving as a cylinder for a piston 12. When the piston 12 is pushed down, there is generated a negative pressure in the suction pump. An excess of air within the subsidiary tanks is sucked out by the negative pressure through the air suction tubes 9 and 10. At the same time, residual inks' dust, etc., are sucked out from the nozzles by the negative pressure through ink suction tubes 13 and 14 connected to the cap 8. The inks, sucked by the negative pressure, are exhausted toward the bottom of the pump through an exhaust opening 15 and a check valve 16 during the upward movement of the piston 12. To alternatively effect the ink suction and exhaust, the check valve 16 closes the exhaust opening 15 during the downward movement of the piston and opens it during the upward movement of the piston. The piston 12 has an elastic seal ring 17 tightly fixed thereto to seal the gap between the piston and the cylinder. FIG. 3A shows the piston 12 in further detail. FIG. 3B is a cross-section thereof taken along the line B—B in FIG. 3A.

To ensure the axial movement of the piston while keeping it against rotation about its axis, there is provided a square guide rod 18 fitted in a square guide slot 19. The guide rod 18 is fixed to the cylinder 11. The elastic seal 17 is composed of a thin sheet and two ring shaped portions 17A disposed axially spaced from each other on the thin sheet. The two circumferential ring portions 17A are connected to each other by four axial connection portions 17B so that when the piston 12 with the seal 17 is inserted into the cylinder 11, four separate rooms are formed by the seal 17 therein.

FIG. 2 shows the capping device in the starting position for ink suction and in the returned position after ink suction. In either case, the nozzle ends of the multi-ink jet head 5 are closed with the cap 8. To start a suction operation, the operator pushes down the piston 12 from the position shown in FIG. 2. After completing the operation for suction, the piston 12 is returned back again to the position shown in FIG. 2 by the action of a return spring 20. When the piston 12 is moved down, the space 21 defined by the piston and the cylinder is expanded and the valve 16 is closed, thereby generating a negative pressure. The negative pressure causes the different color inks to flow into the suction tubes 13 and 14 from the nozzles respectively. At the same time, an excess of air present in the respective subsidiary ink tanks of the head units flow into the air suction tubes 9 and 10. Occasionally some amount of ink may flow into also the air suction tubes. Before the expanded space 21 has been fully filled with the sucked ink and in the state where there is still a negative pressure in the suction tubes 9, 10, 13 and 14, the piston 12 is returned back and ink suction ports 22 are closed by the elastic seal 17. Therefore, the tubes 9, 10, 13 and 14 are separated from each other within the pump 7 and completely closed independently with a negative pressure maintained in the tubes. As the suction tubes are closed independently in this manner, there occurs no trouble due to mixture of different color inks during the capped period. With the returning movement of the piston 12, the sucked ink is exhausted from the pump through the ink exhaust opening 15 and the valve 16. The time required for push-down of the piston 12 is not long. One second is sufficient to suck the ink from the closed nozzles by the negative pressure. If the initial volume of the space 21 within the cylinder is selected sufficiently small, then a negative pressure under −8 m·Ag may be obtained very easily. To provide the desired small initial space 21 and also assure the closing of suction tubes with a negative pressure therein, a stopper 23 is provided on the inner upper surface of the cylinder wall 11. A short time before the piston 12 abuts against the stopper 23, the upper ring portion 17A of the elastic seal 17 closes the ink suction ports 22 in the course of piston return by the spring 20. The ports of the air suction tubes 9 and 10 lie on the inner surface of the cylinder wall 11 at the same level as the ports of the ink suction tubes 13 and 14 open.

In the above first embodiment of the invention, the multi-ink jet head has been shown and described as including two ink jet nozzles. However, it is to be understood that the embodiment is applicable also to such multi-ink jet head having three or more ink jet nozzles with a slight modification including the increase of the number of the vertical connection portions 17B or of the ring portions 17A of the elastic seal member 17.

Figure 4:
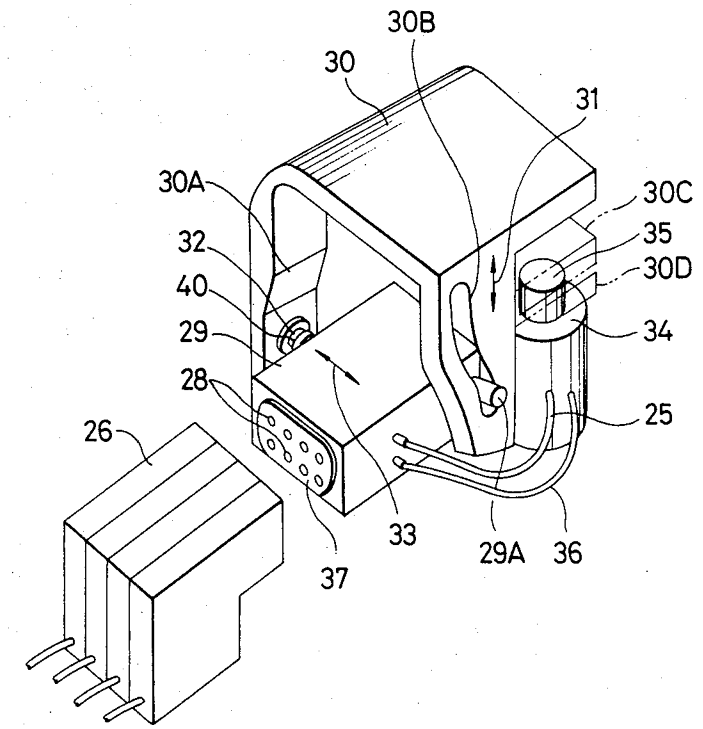
FIG. 4 shows a second embodiment of the invention.
Figure 5A:
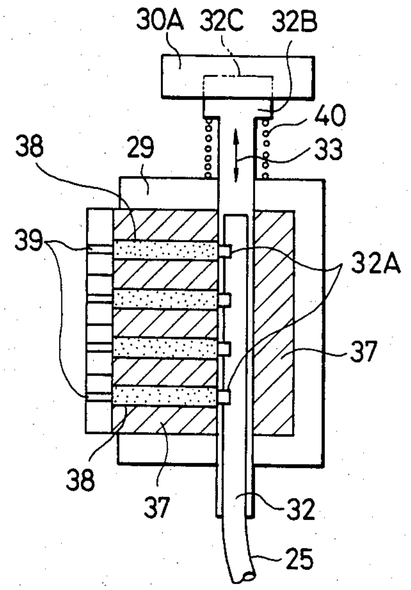
FIG. 5A is a sectional view showing the ink flow channel blocking mechanism constituting the essential part of the invention.

FIG. 4 shows a second embodiment of the invention. 26 is a multi-ink jet head and 29 is a capping device having an elastic cap 37. 25 is an ink flow channel formed by a flexible tube. The cap has ink channels 28 opposed to the multi-ink jet head 26. A pin 29A projects from the side wall of the capping device 29. 30 is a lever having a slot cam 30B in which the pin 29A is engaged in to form a pin-slot engagement. The lever 30 is moved down and up in the direction of arrow 31. As shown in FIG. 5A, the capping device 29 contains therein an ink channel blocking mechanism, as will be later described.

The lever 30 is a control means for controlling the movement of the capping device 29 and the opening and closing of the ink channels. Through the pin-slot engagement 29A, 30B, the vertical movement of the lever 30 is transformed into a horizontal movement of the capping device 29 to control the relative position of the cap to the head. The lever 30 has further a cam portion 30A engageable with a hollow shaft-shaped member 32 of the ink channel blocking mechanism. Through the engagement with and disengagement from the cam portion 30A of the vertical moving lever 30, the hollow shaft member 32 of the blocking mechanism is moved forward and backward horizontally in the direction of double arrow 33. As a negative pressure source there is provided a suction pump 34 directly under one end of the lever 30 in such manner that the piston 35 of the suction pump 34 can be moved down and up by the down-and-up movement of the lever 30. The suction pump 34 and the cap 29 are connected each other through the ink flow channel 25 and air exhaust channel 36 to transmit the negative pressure to the cap from the suction pump.

Figure 5B:
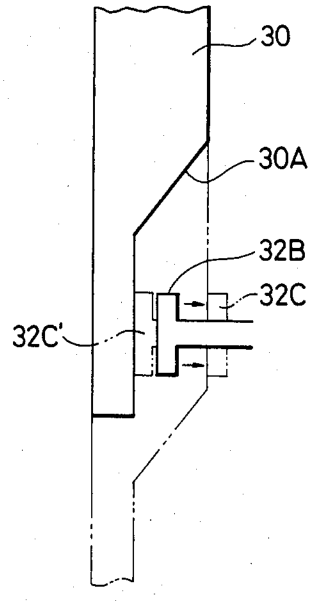
FIG. 5B illustrates the operational relation between the cam and the hollow shaft during the upward and downward movement of the cam for opening and closing the ink flow channels.

The manner of operation of the ink channel blocking mechanism shown in FIG. 5 is as follows: As shown in FIG. 5A, the cap device 29 includes the above-mentioned elastic cap member 37 having ink channels 38 formed therein corresponding to the nozzles 39 from which different color inks are jetted respectively. The hollow shaft-shaped member 32 of the blocking mechanism has cutout portions 32A. The hollow shaft member 32 is closed at one end and open at the other end. The hollow shaft member is disposed in such manner that the cutout portions 32A correspond to the rear ends of the ink channels 38 respectively. The open end of the member 32 is in communication to the suction pump 34 through the ink flow channel 25. Therefore, in the position shown in FIG. 5A, all of the ink channels 38 are merged into the hollow shaft 32 and in communication with the suction pump. This is the position for ink suction from the ink jet nozzles 39. In this position, the cam portion 30A of the lever 30 and the enlarged head portion 32B of the hollow shaft member 32 are in engagement with each other and, therefore, the enlarged head portion 32B is in the position retracted by the cam portion 30A, that is, in the position denoted by reference numeral 32C in FIG. 5B.

When the lever 30 is moved upward from the position shown in FIG. 5A, the hollow shaft member 32 is moved back to its starting position by the action of a return spring 40. Thus, the enlarged head portion 32B of the hollow shaft member 32 comes back to the position indicated in phantom at 32C' in FIG. 5B. With this movement of the hollow shaft member 32, the cutout portions 32A on the hollow shaft depart from the corresponding open ends of the ink channels 38 and all of the ink channels 38 are closed by the wall of the hollow shaft member 32. In this manner, the ink channels 38 in the cap are blocked off by the hollow shaft member 32 which, therefore, serves as a member for opening and closing the ink channels 38. The member for opening and closing the ink channels may be modified in such manner that the communication between the hollow room of the member 32 and the ink channels 38 can be blocked off by rotating the hollow member. With this modification, the same effect as above can be attained.

The manner of operation of the suction pump and its detailed construction will be described hereinafter with reference to FIG. 6.

The suction pump 34 serving as a negative pressure source comprises a piston 35, O-rings 41A, 41B, 41C provided for sealing, a valve 42 which opens for exhaust, a spring 43 for biasing the piston 35 to upward movement and a pump suction port 45. The suction port 45 is so disposed as to communicate with the reduced pressure room 44 formed in the pump when the piston 35 is moved down. One end of the ink flow channel 25 is connected to the pump suction port 45.

As previously mentioned, when the lever 30 is moved downward in the direction indicated by the arrow 31, the cap device 29 is moved forward toward the multi-ink jet head 26 through the pin-slot engagement 29A, 30B and the elastic cap member 37 is brought into pressure-contact with the nozzles (not shown) of the head 26. Thus, the nozzle ends are completely closed by the elastic cap member 37 with the nozzles in communication with the ink channels 38 within the cap. With a further downward movement of the lever 30 after forming the close contact between the nozzles and the cap, the piston 35 of the suction pump 34 is pushed down by the lever 30. The space 44 in the pump is expanded with the downward movement of the piston and there is formed a communication between the space 44 and the pump suction port 45 thereby generating a negative pressure within the hollow shaft member 32. Immediately after the generation of the negative pressure within the hollow shaft member, the cam portion 30A of the lever 30 comes into engagement with the enlarged head portion 32B of the hollow shaft member 32. The cam portion 30A moves the hollow shaft member 32 backward against the biasing force of the spring 40 up to the position shown in FIG. 5A. Thereby a communication is formed between the ink channels 38 and the negative pressure source to suck ink from the nozzles of the multi-ink jet head. When the lever 30 is pushed down to the position suggested by phantom 30D in FIG. 4, ink and other undesirable materials are sucked out from the nozzles, removing of the cause abnormal printing performance.

When the lever 30 is released from the push-down force, the piston 35 moves back upwardly and also the lever 30 is moved up from the position 30D to the position 30C in FIG. 4. At the same time, the hollow shaft member 32 is moved back to the position 32C' suggested in FIG. 5B because the cam portion 30A of the lever 30 also moves upward. Therefore, in the manner described above, the ink channels 38 are all blocked off. On the other hand, the cap 29 remains in the position to which it is moved forward by the pin-slot engagement 29A, 30B because of the relatively long straight linear portion of the slot cam 30B. Therefore, the nozzles in the head 26 are kept tightly closed with the cap even after the return of the lever 30 to the position 30C in FIG. 4.

Figure 6:
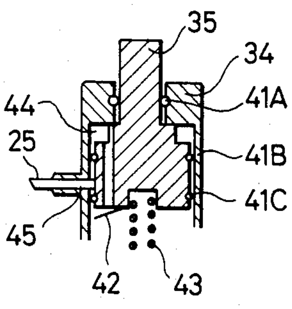
FIG. 6 is a detailed sectional view of the negative pressure source used in the embodiment.

The above blocking of the ink channels 38 by the hollow shaft member 32 takes place when the piston 35 is moved up to the position shown in FIG. 6. In this position, the negative pressure once produced in the space 44 still remains in the ink flow channel 25 and the pump suction port 45 lies in the area between two O-rings 41B and 41C. Therefore, the sucked ink within the channel 25 is held on the side of the negative pressure source and is prevented from backflow. There is no possibility that the ink channels 38 may be contaminated by the different color inks mixed together.

The multi-ink jet head 26 can be released from the cap by pushing up the lever 30 to the position indicated by the solid shown in FIG. 4 using an external force not shown.

As will be readily understood from the foregoing, the above embodiments of the invention have remarkable advantages over the prior art ones.

Even when the multi-ink jet head is left standing with the cap being applied thereto for a long time after an ink suction operation by means of negative pressure, there is no danger mixing of different color inks in the ink channels. After the suction of different color inks from the respective nozzles to recover the normal state of the head, the ink channels are shut off from each other in the state of negative pressure and filled with their own ink only. Inks in different colors in different ink channels are never mixed together after ink suction by the negative pressure. The ink channels are opened after a negative pressure has been formed in the member for closing and opening the channels. This prevents the backflow of the mixed color inks into the nozzles from the member and the channels in communication with the member.

It is unncessary to provide the same number of suction pumps, suction channels, etc., as the number of the colors of ink used in the head. A single suction pump, single ink suction channel, etc., are used in common to all for the ink jet nozzles of one multi-ink jet head. This enables to further simplify the construction of the apparatus as a whole.

Obviously many modifications and variations of the present invention are possible in the light of the above teachings. It is therefore to be understood that within the scope of the appended claims, the invention may be practiced otherwise than as specifically described.

What I claim is:

1. A suction device for a multi-ink jet head comprising:

means for airtightly closing the respective fore ends of a plurality of nozzles provided in such a head to jet inks of respective different colors;

suction means for sucking the closed nozzle ends;

a plurality of ink suction channels disposed between said closing means and said suction means and connecting said closing means and said suction means, wherein each of said channels is provided for a respective ink color and wherein said suction means prevents ink from one of said channels from entering another of said channels during suction; and means for preventing the different color inks from being mixed together when said suction means is not in operation, by blocking off said ink suction channels when said suction means is not in operation for suction.

2. A suction device according to claim 1, wherein said suction channels are equal in number to the nozzles and are disposed to connect said closing means and said suction means without communicating with each other when suction is not being applied by said suction means.

3. A suction device according to claim 2, wherein said suction means includes a cylinder member connected to one end of each of said suction channels and a piston member movably fitted in said cylinder member, and wherein said piston member has a seal member for isolating said suction channels from each other when said suction means is not in operation to apply suction to said suction channels.

4. A suction device according to claim 3, wherein said piston member has a guide surface for preventing said piston member from being rotated relative to said cylinder member.

5. A suction device according to claim 1, wherein said multi-ink jet head includes ink reservoir portions provided each for a respective nozzle independently and wherein said channels connect said ink reservoir portions and said suction means.

6. A suction device according to claim 1, wherein said preventing means is a member for closing and opening said ink suction channels, said member opening said suction channels for suction of ink from the respective nozzles by said suction means.

7. A suction device according to claim 6, wherein said ink suction channels merge into one and said channel closing and opening member closes and opens said suction channels at a point lying on the nozzle side away from the point where said suction channels merge.

8. A suction device according to claim 6 or 7, wherein said device further comprises control means for controlling the operation of said suction means and wherein said channel closing and opening member is interlocked with said control means in such manner that said member normally keeps said suction channels closed and opens them only when said suction means is in operation for suction.

9. A suction device according to claim 8, wherein said nozzle closing means moves toward and away from said nozzles interlocking with said control means.

10. A capping device for a multi-ink jet head, comprising:

means for airtightly closing the respective fore ends of a plurality of nozzles provided in such a head to jet different colors of ink;

means for generating a negative pressure;

first ink suction channels equal in number to the nozzles and connected to said nozzle closing means;

an additional ink suction channel connecting said first ink suction channels to said negative pressure generating means for sucking the nozzle ends by a negative pressure generated from said negative pressure generating means; and means disposed between said first ink suction channels and said additional ink suction channel to close and open said first ink suction channels in coordination with operation of said negative pressure generating means to prevent passage of ink from any of said first ink suction channels into the nozzles.

11. A capping device according to claim 10, further comprising control means for controlling the operation of said negative pressure generation means and wherein said control means has a first engaging portion engageable with said channel closing and opening means such that said channel closing and opening means is normally held in a position for closing said first ink suction channels and such that when said negative pressure generation means is in operation, said channel closing and opening means is brought to a position for opening said first ink suction channels.

12. A capping device according to claim 11, wherein said channel closing and opening means closes said first ink suction channels when said negative pressure generation means is at the last step of its operation for generating a negative pressure and the pressure prevailing in said first ink suction channels is still negative.

13. A capping device according to claim 10 or 11, wherein said control means further includes a second engaging portion engageable with said nozzle closing means to move the latter toward and away from said nozzles.

* * * * *

UNITED STATES PATENT AND TRADEMARK OFFICE

CERTIFICATE OF CORRECTION

PATENT NO. : 4,492,969

DATED : January 8, 1985

INVENTOR(S) : KOJI TERASAWA

It is certified that error appears in the above-identified patent and that said Letters Patent is hereby corrected as shown below:

Column 5, line 39, change "of the cause" to --the cause of--.

Signed and Sealed this

*Twenty-third* Day of *July 1985*

[SEAL]

*Attest:*

DONALD J. QUIGG

*Attesting Officer* *Acting Commissioner of Patents and Trademarks*